US011085870B2

(12) United States Patent
Fitelson et al.

(10) Patent No.: US 11,085,870 B2
(45) Date of Patent: Aug. 10, 2021

(54) NON-CLASSICAL IMAGING

(71) Applicant: Northrop Grumman Systems Corporation, Falls Church, VA (US)

(72) Inventors: Michael M. Fitelson, Columbia, MD (US); Jane Sprigg, Catonsville, MD (US); Eduard Y. Luzhanskiy, Ellicott City, MD (US); George R. Gray, Eldersberg, MD (US); Scott Kelber, Columbia, MD (US)

(73) Assignees: Northrop Grumman Systems Corporation, Falls Church, VA (US); Tarsier Optics, Inc., Baltimore, MD (US)

( * ) Notice: Subject to any disclaimer, the term of this patent is extended or adjusted under 35 U.S.C. 154(b) by 247 days.

(21) Appl. No.: 16/415,382

(22) Filed: May 17, 2019

(65) Prior Publication Data

US 2020/0363318 A1    Nov. 19, 2020

(51) Int. Cl.
| | | |
|---|---|---|
| *G06K 9/00* | (2006.01) | |
| *G01N 21/17* | (2006.01) | |
| *G06T 5/10* | (2006.01) | |
| *G06T 5/00* | (2006.01) | |

(52) U.S. Cl.
CPC .............. *G01N 21/17* (2013.01); *G06T 5/009* (2013.01); *G06T 5/10* (2013.01); *G01N 2021/1725* (2013.01); *G01N 2021/1772* (2013.01); *G06T 2207/10032* (2013.01)

(58) Field of Classification Search
CPC ... G01N 2021/1725; G01N 2021/1772; G01N 21/17; G06T 2207/10032; G06T 5/009; G06T 5/10
See application file for complete search history.

(56) References Cited

U.S. PATENT DOCUMENTS

| | | | |
|---|---|---|---|
| 5,108,168 A * | 4/1992 | Norbert ................. | G02B 7/183 359/350 |
| 8,488,961 B2 * | 7/2013 | Yoshida ............. | H04B 10/2569 398/29 |

(Continued)

OTHER PUBLICATIONS

Sprigg, Jane, Tao Peng, and Yanhua Shih. "Super-resolution imaging using the spatial-frequency filtered intensity fluctuation correlation." Scientific reports 6.1 (2016): 1-7. (Year: 2016).*

(Continued)

*Primary Examiner* — Avinash Yentrapati
(74) *Attorney, Agent, or Firm* — Edell, Shapiro & Finnan, LLC (57) ABSTRACT

Intensity values of electromagnetic radiation from an object to be imaged are received from an array of detectors. The array of detectors includes one or more pairs of detectors arranged as antisymmetric pairs of detectors. A Fourier transform of an image of the object is determined by correlating fluctuations of the intensity values for each antisymmetric pair of detectors. An inverse of the Fourier transform is determined, and an image of the object is generated from the inverse Fourier transform. The Fourier transform of the mean intensity pattern across the array of detectors may also be used to determine when the array is properly oriented to separate the image and mirror image.

20 Claims, 9 Drawing Sheets

(56) References Cited

U.S. PATENT DOCUMENTS

| | | | |
|---|---|---|---|
| 8,532,427 B2* | 9/2013 | Meyers | G06T 5/50 |
| | | | 382/274 |
| 9,444,978 B2 | 9/2016 | Shih et al. | |
| 9,727,959 B2* | 8/2017 | Meyers | G06T 5/008 |
| 2010/0123091 A1 | 5/2010 | Gilbert et al. | |
| 2012/0257197 A1* | 10/2012 | Feldkhun | G01N 21/4795 |
| | | | 356/301 |
| 2012/0327287 A1* | 12/2012 | Meyers | G01B 11/24 |
| | | | 348/335 |
| 2014/0029850 A1* | 1/2014 | Meyers | G06T 5/001 |
| | | | 382/167 |
| 2014/0353475 A1* | 12/2014 | Meyers | G06T 3/4053 |
| | | | 250/216 |
| 2016/0005154 A1* | 1/2016 | Meyers | G06T 5/008 |
| | | | 382/274 |
| 2018/0255212 A1* | 9/2018 | Sprigg | G06T 5/003 |

OTHER PUBLICATIONS

Sprigg et al. Super-resolution imaging using the spatial-frequency filtered intensity fluctuation correlation, Scientific Reports, 6:38077; doi: 10.1038/srep38077, Published Dec. 1, 2016, pp. 1-7.

Shin, The Physics of Turbulence-Free Ghost Imaging, Technologies, 2016, 4, 39, pp. 1-15.

Zhang et al., Lensless fourier-transform ghost imaging with classical incoherent light, Research Gate, Physical Review A, Jun. 2006, 15 pages.

* cited by examiner

FIG.8

NON-CLASSICAL IMAGING

TECHNICAL FIELD

The present disclosure relates to providing imaging for objects using non-classical optical techniques

BACKGROUND

Using classical imaging techniques, the angular resolution of a device, such as a telescope, is inversely proportional to the size of the objective of the imaging device. In other words, to be able to image smaller objects, a larger objective is required. For example, to resolve features on the scale of 0.5 meters on an object $3.57 \times 10^7$ meters (22,236 miles) away, a telescope with a 55 meter objective may be required. Geosynchronous satellites orbit the earth at such an altitude. Accordingly, to image such satellites, 55 meter objective telescopes may be necessary. Such telescope are generally not feasible.

Recent experiments in non-classical imaging techniques have shown promise in improving the resolution beyond those achieved through classical techniques. Yet, such experiments have been unable to produce the full image of the object.

DESCRIPTION OF EXAMPLE EMBODIMENTS

Overview

Intensity values of electromagnetic radiation from an object to be imaged are received from an array of detectors. The array of detectors includes one or more pairs of detectors arranged as antisymmetric pairs of detectors. A Fourier transform of an image of the object is determined by correlating fluctuations of the intensity values for each antisymmetric pair of detectors. An inverse of the Fourier transform is determined, and an image of the object is generated from the inverse Fourier transform. According to specific example embodiments, the array of detectors is shifted relative to the line of sight to the object such that an image of the object and its mirror image are formed in opposite quadrants of the array of detectors.

According to specific example embodiments, the received electromagnetic radiation intensity values are used to calculate an average (e.g., mean) combined intensity for each antisymmetric pair of detectors. Also from the received intensity values, fluctuations of the combined intensity from the average intensity for the antisymmetric pair of detectors may also be determined. Similarly, an average (e.g., mean) intensity for one of the detectors of the antisymmetric pair may be determined from the received electromagnetic intensity values. Fluctuations of the intensity values for the one detector of the antisymmetric pair of detectors are determined. The intensity fluctuations for the one detector may be correlated with the fluctuations of the combined intensity for the antisymmetric pair of detectors. As explained in detail below, this correlation results in data that includes the Fourier transform of the image of the object. Taking the inverse Fourier transform of this data allows for the generation of an image of the object.

Example Embodiments

Figure 1:
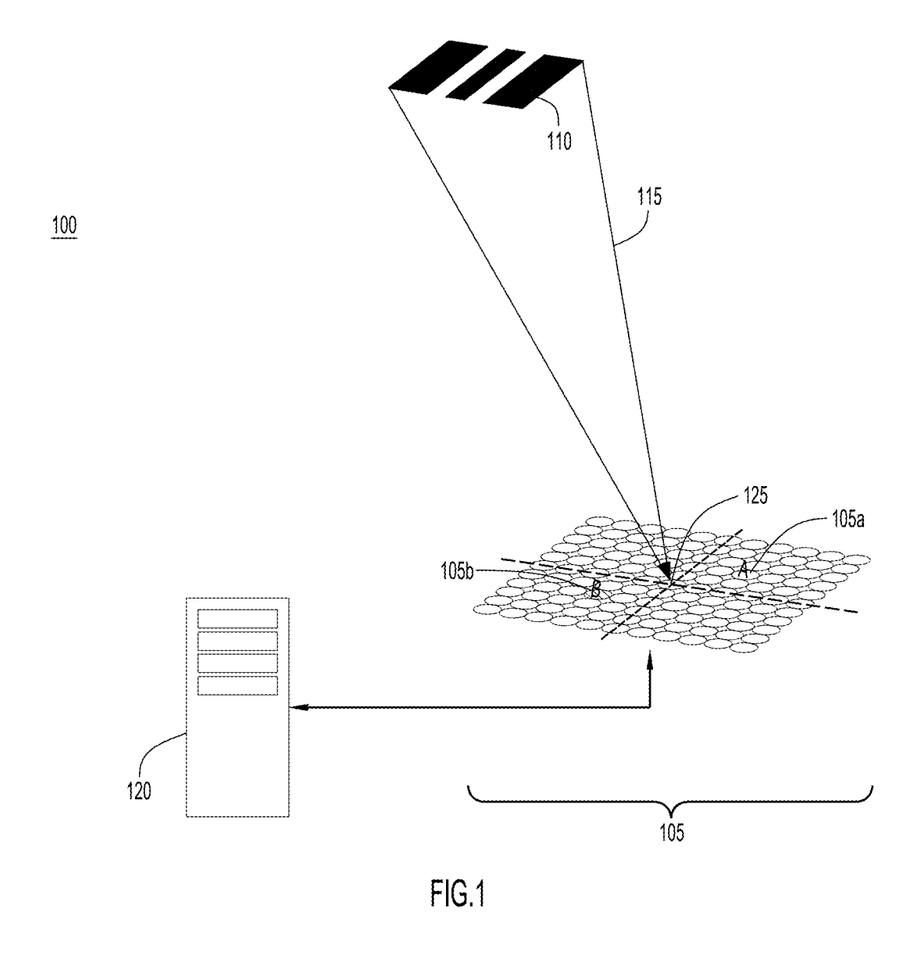
FIG. 1 illustrates an imaging system implementing the non-classical imaging techniques of the present disclosure, according to example embodiments.

With reference now made to FIG. 1, depicted therein is a system 100 configured to image an object 110 according to the non-classical imaging techniques of the present disclosure. As will be explained in greater detail below, the electric field resulting from light reflected from a distant object contains information that can reveal the Fourier transform of the image of the distant object. This information may be determined through measurement of the intensity fluctuation correlations associated with antisymmetric pairs of detectors arranged in, for example, a detector array at the Fourier plane of the object. Correlating the intensity fluctuations for a plurality of antisymmetric detector pairs with a member of the detector pair yields the true Fourier transform of the object image. Calculating the inverse Fourier transform then gives the image. Resolution achieved through such techniques may be proportional to the size of the Fourier plane region that is sampled.

As illustrated in FIG. 1, detector array 105 is configured to receive electromagnetic radiation 115 (e.g., electromagnetic radiation emitted or reflected from object 110). As noted above, the intensity of the electric field detected by detector array 110 from the electromagnetic radiation 115 received from object 110 may contain information that may be used to determine the Fourier transform of an image of object 110. Accordingly, processing device 120 may be configured to receive data indicative of the electric field intensity of electromagnetic radiation 115 from detector array 105. Based on this data, processing device 120 may determine an inverse Fourier transform for the intensity values, and from this inverse Fourier transform, an image of object 110 may be generated.

According to an example embodiment of the present disclosure, the Fourier transform of the image of object 110 is determined from electric field intensity fluctuation correlations associated with antisymmetric detector pairs of detector array 105. As used herein, anti symmetric pairs of detectors refer to pairs of detectors that have the same magnitude of displacement from the center 125 of detector array 105, but whose displacements have opposite signs. In other words, the detectors of antisymmetric pairs of detectors may be located at positions within detector array 105 that are reflections through the center 125 of detector array 105, as such a reflection results in locations that are the same distance from the center 125, but that are displaced from center 125 in opposite directions. Accordingly, detectors 105a and 105b form an antisymmetric pair of detectors in detector array 105.

By correlating the intensity fluctuations of the electric field intensities of all antisymmetrical pairs of detectors with one of the detectors of the pair yields a Fourier transform of the image of object 110. Calculating the inverse Fourier transform of the Fourier transform of the image of object 110 may then be used to determine the image of object 110.

For example, random photons may be reflected from object 110 being illuminated by solar radiation. The photons are collected and registered in time over the detectors contained in detector array 105. The detectors of detector array 105 are arranged in an evenly spaced pattern throughout an appropriately defined region sampling a sufficiently large section of the Fourier plane of object 110. Detector array 105 may be arranged in a grid over a relatively large area to accurately represent the Fourier transform of object 110. Furthermore, detector array 105 may be configured with a mechanical structure that allows for the tilting or shifting of detector array 105. As will be described below, this tilting or shifting facilitates the offsetting of object 110 from the center 125 of detector array 105.

Intensity measurements from each detector of detector array 105 are taken and transferred to processing device 120, where data indicative of the measurements may be stored in memory.

From the data stored in the memory, processing device 120 may perform calculations as described herein in order to generate an image of object 110. For example, the data indicative of the intensity values from two antisymmetrically placed detectors, such as detectors 105a and 105b, may be determined over a relatively short time interval. These short term measurements are averaged by processing device 120 over a long time interval to compute the combined mean intensity of the two detectors. The data stored in the memory of processing device 120 may also be used to calculate the deviation above and below the calculated combined mean intensity for the pair of antisymmetrically placed detectors, e.g., detectors 105a and 105b.

In conjunction with the above described calculations for the pair of antiymmetrically arranged detectors 105a and 105, the mean value of the intensity measurements is calculated for each of detectors 105a and 105b individually. The deviations above and below the mean are also calculated by processing device 120 for each of detectors 105a and 105b individually. The intensity fluctuations for detector 105a are correlated with the intensity fluctuations for the combination of detector 105a and 105b. Similarly, the intensity fluctuations for detector 105b are correlated with the intensity fluctuations for the combination of detector 105a and 105b. Thus, the value of the quantum (i.e., non-classical) imaging signal at detector 105a is determined by correlating the intensity fluctuations measured by detector 105a with the combined intensity fluctuations measured by both detectors 105a and 105b added together. The value of the quantum imaging signal at detector 105b is determined by correlating the intensity fluctuations measured by detector 105b with the combined intensity fluctuations measured by both detectors 105a and 105b added together.

Processing device 120 may repeat these calculations for each pair of antisymmetrically arranged detectors in detector array 105.

By repeating this procedure for each pair of antisymmetric detectors in array 105, the total signal across the whole array 105 is the Fourier transform of the object 110 convolved with its mirror image, plus the Fourier Transform of the image and the Fourier transform of its mirror image. Offsetting, even slightly, detector array 105 from the line of sight of the object being imaged ensures that the image and mirror image of the object are placed in separate quadrants of detector array 105. Taking an inverse Fourier transform of the results of the correlations described above will return the image of the object being imaged and its mirror image. As described in detail below, the image of the object and the mirror image may be separated from each other to determine the image.

Specifically, the correlation of the intensity fluctuation of detector 105a with the fluctuation of the combined intensity for detector 105a and 105b and repeating that process across the whole 105 array results in four terms: a constant, the Fourier transform of the image of object, the Fourier transform of the mirror image of the object, and the Fourier transform of the image of the object convoluted with itself, as will be described in greater detail below. The inverse Fourier transform yields a delta function scaled by a constant (from taking the inverse Fourier transform of the constant), the convolution of the image with itself (from taking the inverse Fourier transform of the convolution of the image with itself), the image of the object (from taking the inverse Fourier transform of the image of the object) and its mirror image of the object (from taking the inverse Fourier transform of the mirror image of the object), as will also be described in greater detail below. Locating detector array 105 off center relative to the object will place the image of the object and its mirror image in opposite quadrants, allowing them to be combined after the images are formed or viewed separately.

In order to carry out the above described calculations, processing device 120 may utilize the Fresnel near field equation, which for a source at a distance z is given as follows:

$$E_{Am}(\vec{\rho}_A, t_j) = \text{Exp}\left[\frac{ik}{z}(\vec{\rho}_A - \vec{\rho}_{0m})^2 + z^2)\right]e^{i\phi_m}A(\vec{\rho}_{0m}),$$

$$\phi_m = \vec{\kappa}_m \cdot \vec{\rho}_{0m};$$

where k is the wave number, $\vec{k}$ is the wave vector, $\vec{\rho}_A$ is the vector describing the location of detector A, $\vec{\rho}_{0m}$ is the vector describing the location of the photons from the object relative to detector A, $A(\vec{\rho}_{0m})$ is the distribution of random sources in the object plane, z is the distance to the object and $\varphi_m$ is a random phase associated with the $m^{th}$ photon.

Figure 2:
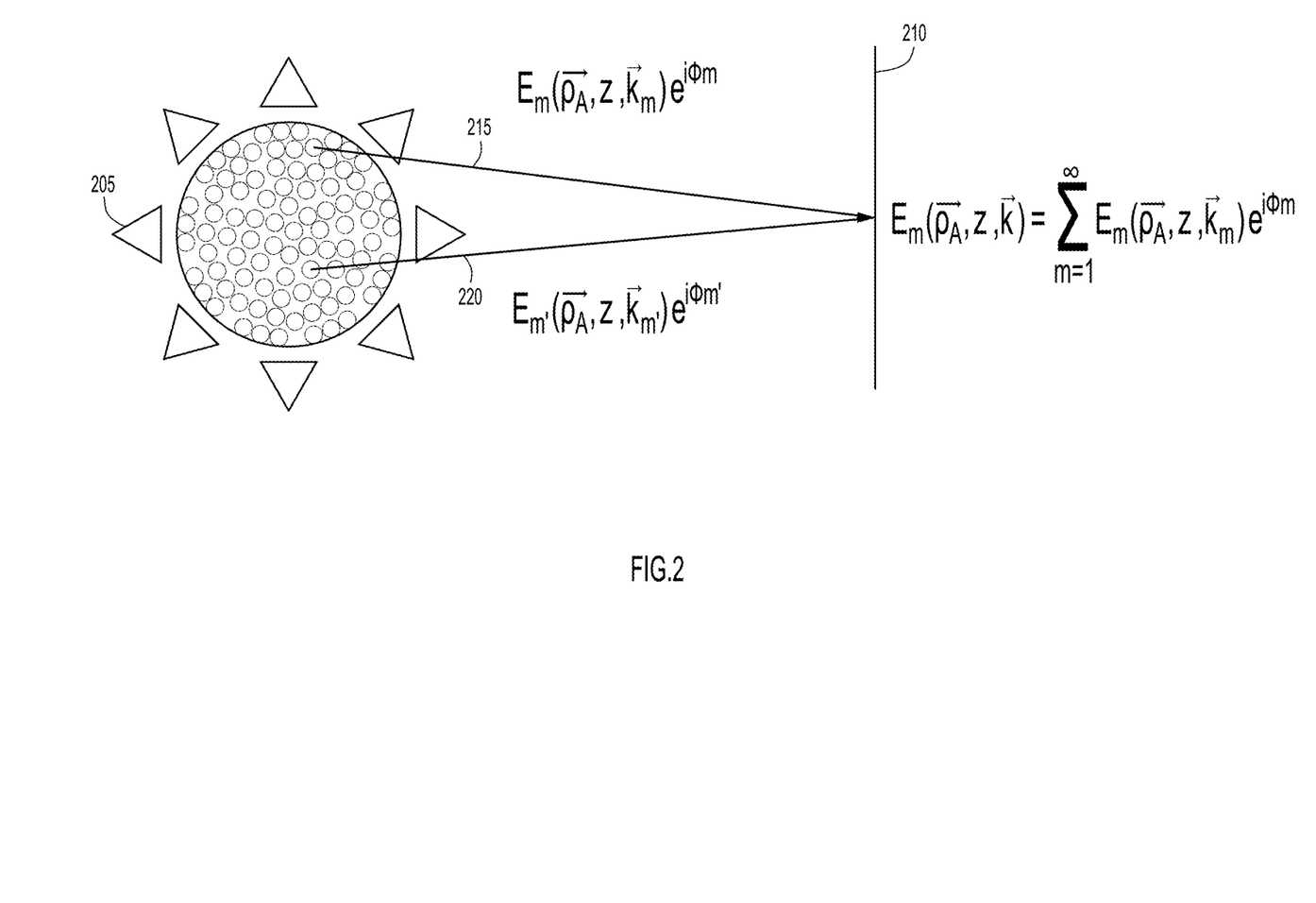
FIG. 2 is a graphical representation of the electric field values received from two different photons at a detector, according to example embodiments.

With reference briefly made to FIG. 2, depicted therein is an illustration conceptualizing the usage of the Fresnel field equation according to example embodiments of the techniques of the present disclosure. As illustrated in FIG. 2, the electric field value at detector 210 is the sum of the electric field value associated with each photon incident on the detector 210 from source 205. The electric field value at target 210 is the sum of the electric field associated with photon 215 (designated photon "m") and the electric field from photon 220 (designated photon "m"). Accordingly, the electric field at detector 210 is given by:

$$E(\vec{\rho}_A, z, \vec{k}) = $$
$$E_m(\vec{\rho}_A, z, \vec{k}_m)e^{i\phi m} + E_{m'}(\vec{\rho}_A, z, \vec{k}_{m'})e^{i\phi m'} = \sum_{m=1}^{\infty} E_m(\vec{\rho}_A, z, \vec{k}_m)e^{i\phi m}$$

The intensity I at detector 210 would be the magnitude squared of the sum of the electric field values.

Figure 3:
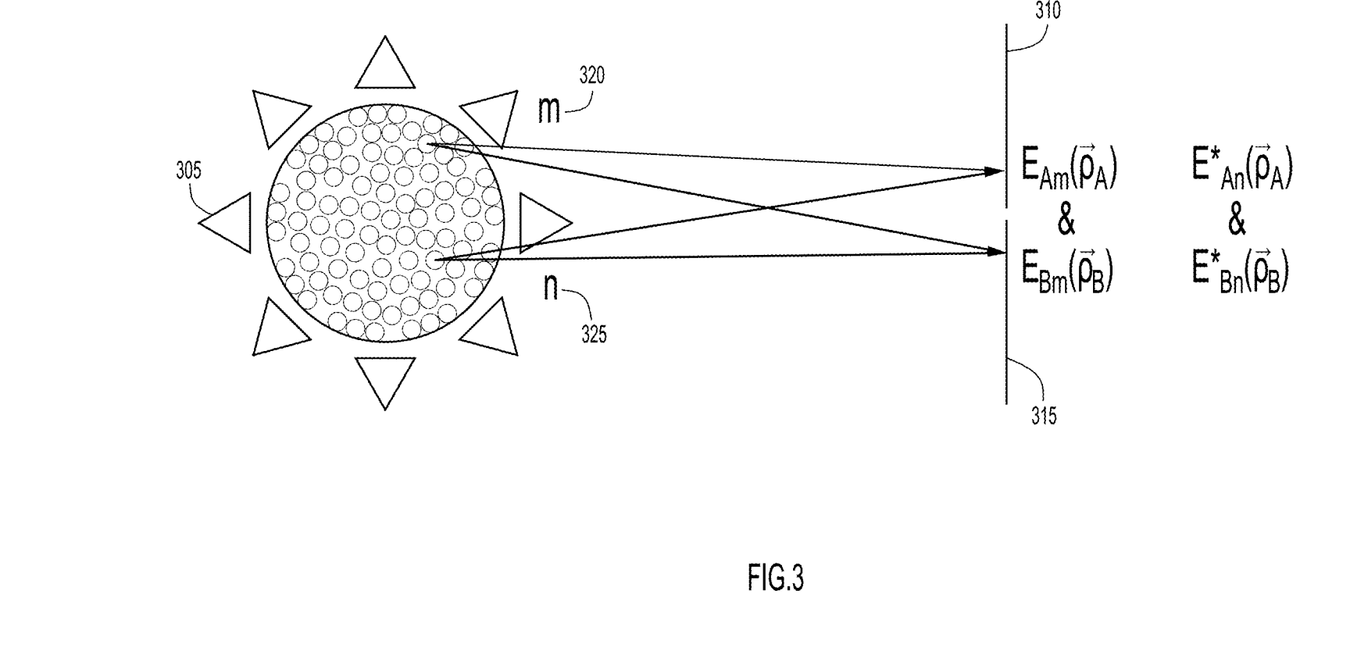
FIG. 3 is a graphical representation of the electric field values received at two antisymmetrically arranged detectors, according to example embodiments.

This concept may be applied to two antisymmetric detectors and two photons, as illustrated in FIG. 3. Illustrated in FIG. 3 is a source 305, two antisymmetric detectors 310 (designated detector "A") and 315 (designated detector "B"), and two photons 320 (designated photon "m") and 325 (designated photon "n"), respectively. As illustrated in FIG. 3, photon 320 may go to either of detector 310 or detector 315. The same is true for photon 325, it may go to either of detector 310 or 315. The intensity measured at either of detector 310 or 315 will be the magnitude squared of the sum of the source photons' electric fields. Accordingly, the intensity fluctuation ΔI at either of the two detectors is of the form:

$$\Delta I = E_m E_n^*$$

where $E_m$ is the electric field for a photon m and $E_n^*$ is the complex conjugate of the electric filed for a photon n, both at the detector. This means that the electric fields at the two detectors are the superposition of the two possible states, as illustrated in FIG. 3.

For the fluctuations of the combined intensity for an antisymmetric pair of detectors, the combined intensity fluctuations may be of the form:

$$\Delta I_E = \sum_{\substack{m,n \\ m \neq n}} E_m E_n^*$$

For each pair of photons m and n it is equally likely that a photon m can be at detector A or detector B. Likewise, for a photon n, it is equally as likely that the phonon can be at detector A or detector B. Therefore, the electric field for photon m may be given by:

$$E_m = E_{Am}(\vec{\rho}_A) + E_{Bm}(\vec{\rho}_B); \quad (1)$$

and the complex conjugate for the electric field from photon n may be given by:

$$E_n^* = E_{An}^*(\vec{\rho}_A) + E_{Bn}^*(\vec{\rho}_B). \quad (2)$$

Accordingly, the combined intensity fluctuation $E_m E_n^*$ will take the following form:

$$\Delta I_E = \sum_{\substack{m,n \\ m \neq n}} E_m E_n^* = E_{Am}(\vec{\rho}_A)E_{An}^*(\vec{\rho}_A) + \quad (3)$$
$$E_{Am}(\vec{\rho}_A)E_{Bn}^*(\vec{\rho}_B) + E_{Bm}(\vec{\rho}_B)E_{An}^*(\vec{\rho}_A) + E_{Bm}(\vec{\rho}_B)E_{Bn}^*(\vec{\rho}_B)$$

The intensity fluctuation of detector A is given by:

$$\Delta I_A(\vec{\rho}_A) = E_{Am}^*(\vec{\rho}_A)E_{An}(\vec{\rho}_A) \quad (4)$$

Accordingly, the time average of the correlation of the intensity fluctuation of detector A with the intensity fluctuation of the combination of detector A and detector B yields:

$$\langle \Delta I_A(\vec{\rho}_A) \Delta I_E \rangle = \sum_{\substack{m,n \\ m \neq n}} E_{Am}^*(\vec{\rho}_A) E_{Am}(\vec{\rho}_A) E_{An}(\vec{\rho}_A) E_{An}^*(\vec{\rho}_A) + \quad (5)$$
$$\sum_{\substack{m,n \\ m \neq n}} E_{Am}^*(\vec{\rho}_A) E_{Am}(\vec{\rho}_A) E_{An}(\vec{\rho}_A) E_{Bn}^*(\vec{\rho}_B) +$$
$$\sum_{\substack{m,n \\ m \neq n}} E_{Am}^*(\vec{\rho}_A) E_{Bm}(\vec{\rho}_B) E_{An}(\vec{\rho}_A) E_{An}^*(\vec{\rho}_A) +$$
$$\sum_{\substack{m,n \\ m \neq n}} E_{Am}^*(\vec{\rho}_A) E_{Bm}(\vec{\rho}_B) E_{An}(\vec{\rho}_A) E_{Bn}^*(\vec{\rho}_B)$$

Because it is equally likely that the photons m and n may be at either detector A or detector B, we may set $\vec{\rho}_B = -\vec{\rho}_A$, and replacing the electric field values with those of equations (1)-(3) yields, the following for the correlation of the intensity fluctuation of detector A with the intensity fluctuation of the combination of detector A and detector B:

$$\langle \Delta I_A(\vec{\rho}_A) \Delta I_E \rangle = \quad (6)$$
$$C^2 + C\mathcal{F}_{\frac{2k}{z}\vec{\rho}_A}^* [|A(\vec{\rho}_{0n})|^2] +$$
$$C\mathcal{F}_{\frac{2k}{z}\vec{\rho}_A} [|A(\vec{\rho}_{0m})|^2] + \mathcal{F}_{\frac{2k}{z}\vec{\rho}_A} [|A(\vec{\rho}_{0m})|^2] \mathcal{F}_{\frac{2k}{z}\vec{\rho}_A}^* [|A(\vec{\rho}_{0n})|^2].$$

The first term in equation (6) is a constant, the second is proportional to the Fourier transform of the image of the object, the third term is proportional to the Fourier transform of the mirror image of the object, and the last term is the Fourier transform of the convolution of the image of the object with the mirror image of the object. Taking the inverse Fourier transform of this expression results in a delta function (i.e., the inverse Fourier transform of a constant), an image of the object (i.e., the inverse Fourier transform of the Fourier transform of the image of object), the mirror image of the object (i.e., the inverse Fourier transform of the Fourier transform of the mirror image of object), and the convolution of the image with itself (i.e., the inverse Fourier transform of the Fourier transform of the convolution of the image of object with itself). Taking the inverse transform, and slightly offsetting the detector array from the line of sight to the object, puts the image and mirror image in separate quadrants. In other words, by taking the inverse Fourier transform of the correlation of the intensity fluctuation of detector A with the intensity fluctuation of the combination of detector A and detector B, the image of the object may be determined. Furthermore, by offsetting the detector array, the image of the object may be isolated from the mirror image of the object, the delta function and convolution of the image with itself that result from the taking the inverse Fourier transform of the other terms in equation (6). In other words, by offsetting the detector array, the image of the object may be separated the other elements that may be determined from the other terms in equation (6).

Figure 4:
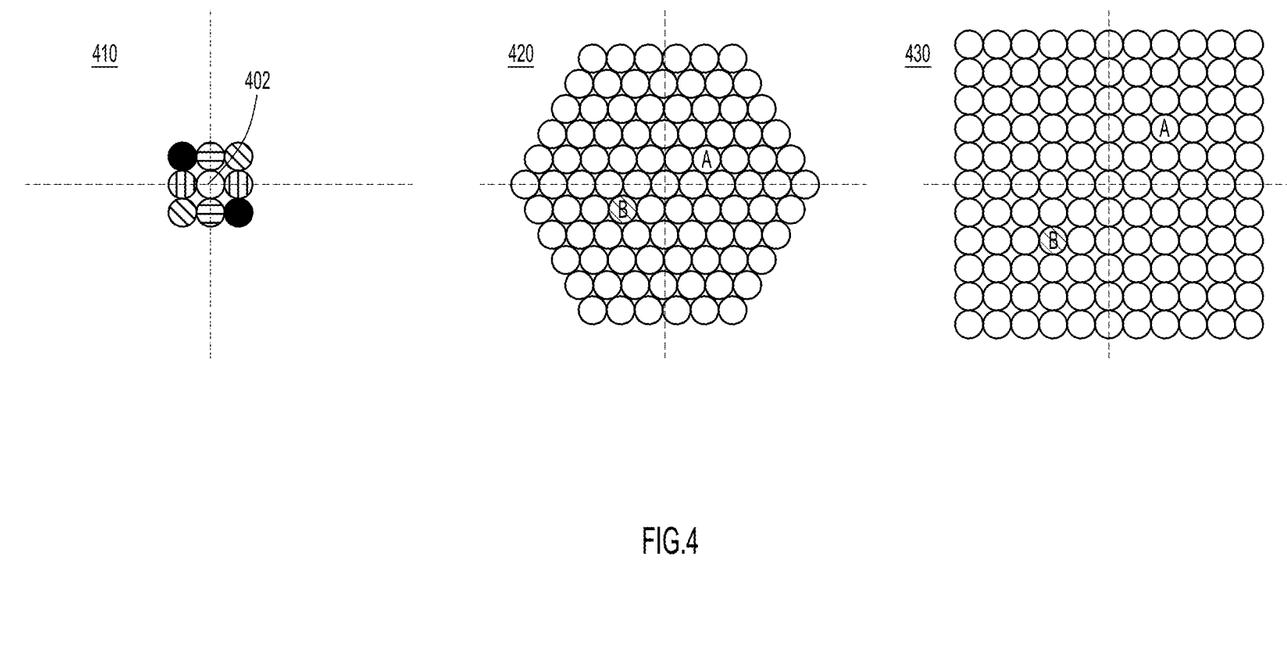
FIG. 4 illustrates a series of detector arrays that may be used to implement the non-classical imaging techniques of the present disclosure, according to example embodiments.

With reference now made to FIG. 4, depicted therein are three detector arrays 410, 420 and 430. Detector array 410 is a simplified detector array illustrating the concept antisymmetric pairs of detectors. As illustrated in detector array 410, the antisymmetric pairs of detectors are illustrated using the same shading, with central detector 402 correlated with itself to produce an overall average brightness of the object. Accordingly, detector array 410 includes five antisymmetric pairs of detectors. In actual embodiments of the detector arrays disclosed herein, the number of antisymmetric pairs of detectors may be substantially higher than that of the five pairs illustrated in detector array 410. Detector arrays 420 and 430 are example embodiments of other arrays of detectors, illustrating that the techniques of the present disclosure are not limited to any particular shape or arrangement of antisymmetric pairs of detectors.

The size of detector arrays 410, 420 and 430 may be dictated by the size of the object being imaged, the distance of the object from the detector array, and the desired resolution of the image to be acquired. For example, a 5 meter by 5 meter object may be imaged by an array of 0.25 meter detectors (described in greater detail below with reference to FIG. 5) from a range of $3.57 \times 10^7$ meters (22,236 miles). Using an array of 729 of the 0.25 meter detectors distributed over a 21 meter by 21 meter area would permit 0.5 meter resolution of such an object at this range. A classical imaging system may require a 55 meter telescope to achieve similar resolution, a telescope that does not exist or that is infeasible to construct and use.

Figure 5:
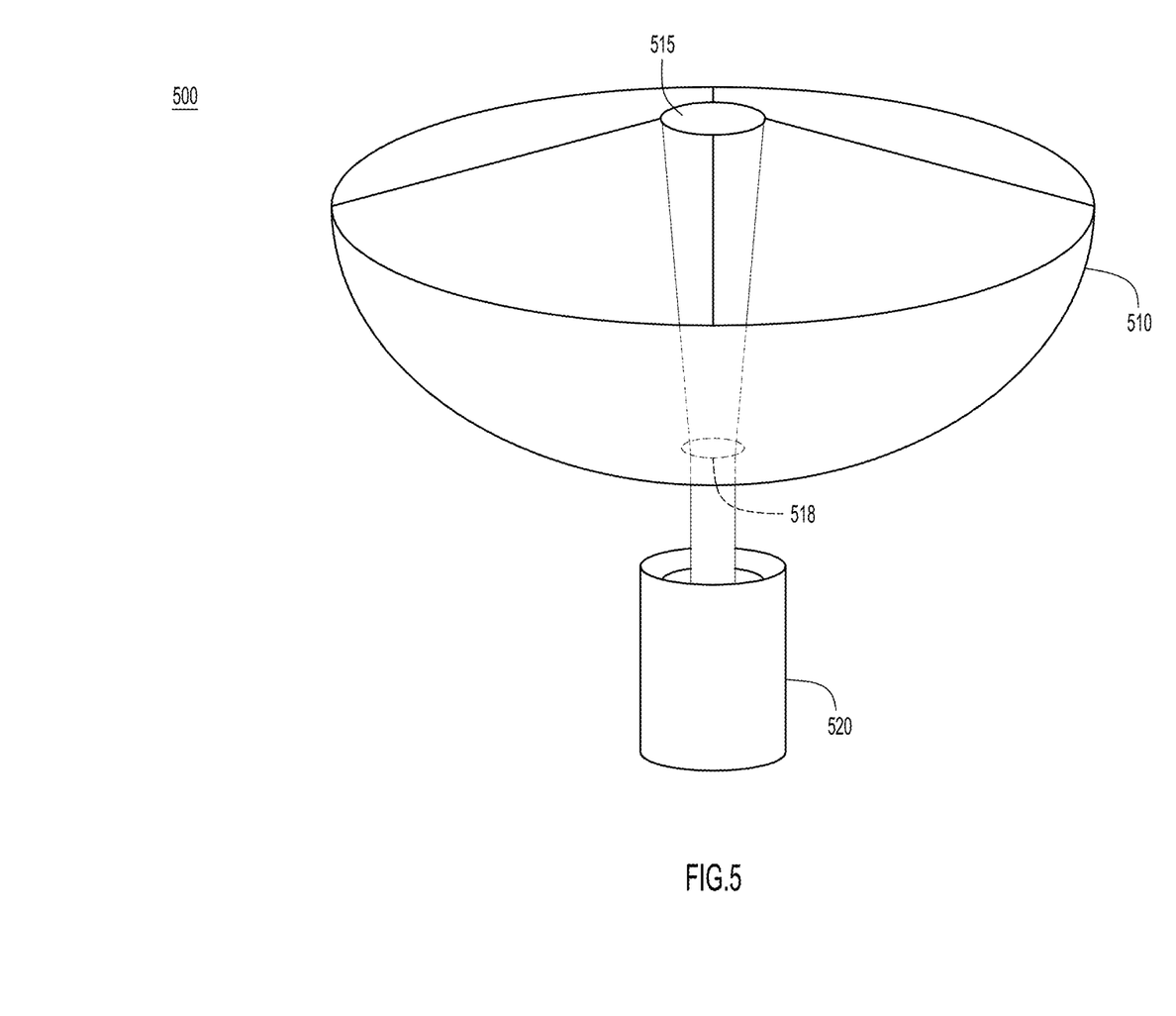
FIG. 5 illustrates the photodetector that may be used to implement the non-classical imaging techniques of the present disclosure, according to example embodiments.

With reference now made to FIG. 5, depicted therein is an example detector 500, according to the techniques described herein. Detector 500 comprises a parabolic mirror 510, a focal reflector 515 and a photomultiplier tube 520. When a photon is incident on parabolic mirror 510, it will be reflected by parabolic mirror 510 onto focal reflector 515 arranged at a focal point of parabolic mirror 510. Focal reflector 515 reflects the photon through hole 518 in parabolic mirror 510 and into photo multiplier tube 520.

Photomultiplier tube 520 includes a photocathode that will convert the photon into an electron. The electron emitted from the photocathode will travel between the photocathode and anode, being multiplied along the way via, for example, one or more dynodes or a continuous dynode multiplier, such as a microchannel plate. Upon reaching the anode, an electric signal is generated corresponding to the photon being incident on the parabolic mirror. This signal may be sent to, for example, processing device 120 of FIG. 1, and data indicative of the signal may be used in the calculations described above. The detector illustrated in FIG. 5 may be considered a single photon detector as it is sufficiently sensitive to detect and provide a signal if even a single photon is received from the object to be imaged. Such a single photon detector may be particularly useful to image faint objects.

Other example embodiments of detectors may be used without deviating from the inventive concepts described herein. For example, the detector arrays of the present disclosure may utilize various types of detectors, including but not limited to photoemissive or photoelectric sensors; semiconductor sensors such as charge coupled devices, photodiodes, active pixel sensors (e.g., complementary metal-oxide semiconductor image sensors); photovoltaic sensors; graphene/silicon photodetectors; and other types of sensors known to the skilled artisan. As would be understood by the skilled artisan, any detector capable of converting an optical signal to an electrical signal with sufficient accuracy to carry out the techniques of the present disclosure may be used without deviating from the inventive concepts disclosed herein.

Figure 6:
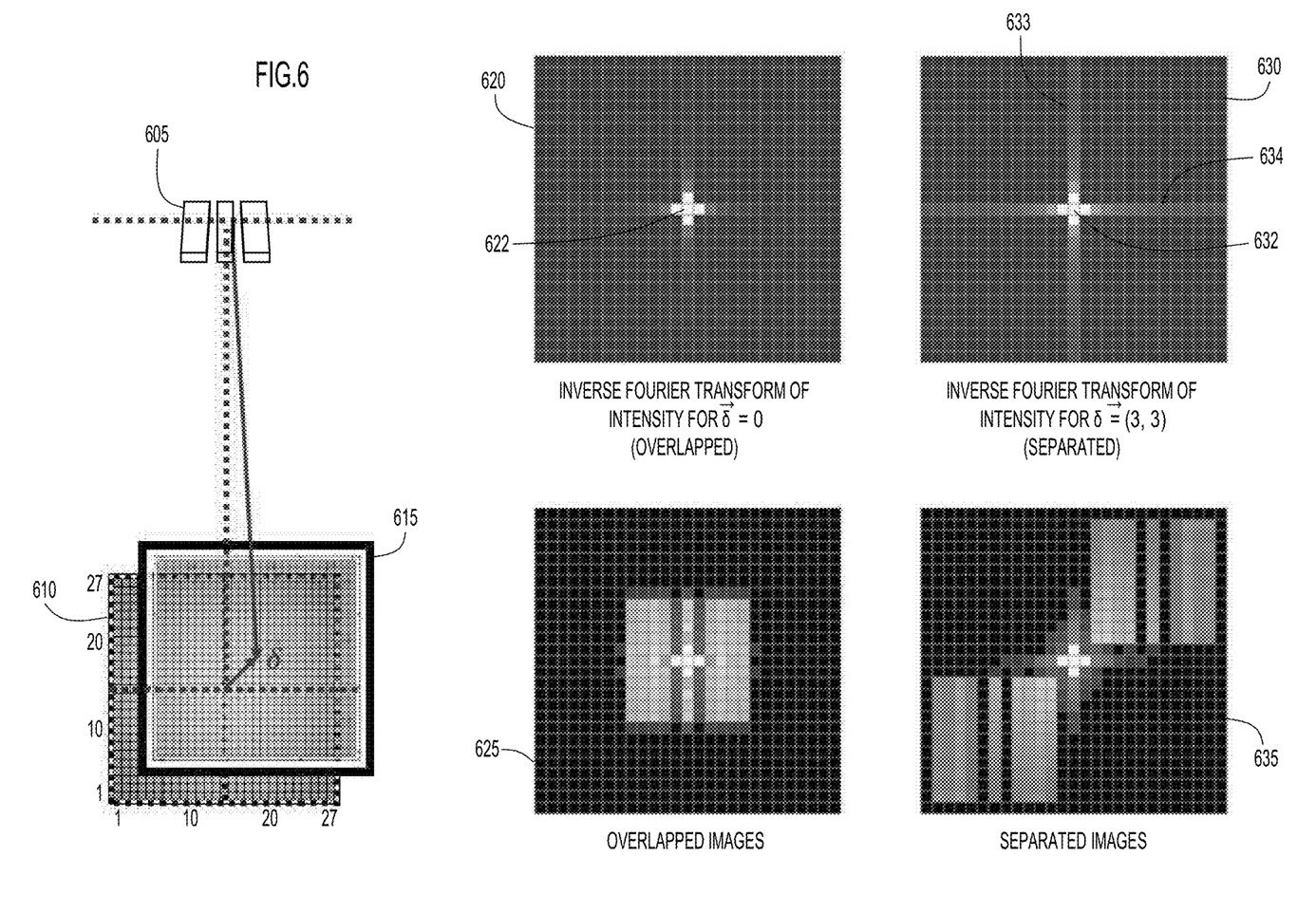
FIG. 6 illustrates detector arrays aligned with and offset from, respectively, an object being imaged, and the resulting images of the object, according to example embodiments.

With reference now made to FIG. 6, depicted therein is an illustration of the results that may be provided by locating the array of detectors off center relative to the object. Illustrated in FIG. 6 is an object 605, a detector array 610 whose center is aligned with object 605 along its optical axis, and a detector array 615 whose center is offset from the optical axis by a value $\vec{\delta}$. In the specific example of FIG. 6, the offset value $\vec{\delta}$ corresponds to an offset equivalent to three detectors in the vertical direction and three detectors in the horizontal direction. Reference numeral 620 is an illustration of the inverse Fourier transform of the intensity measurements when detector array 610 is aligned with object 605, while reference numeral 625 is an illustration of the image and mirror image of the object formed according to the techniques of the present application when detector array 610 is aligned with object 605. Reference numeral 630 is an illustration of the inverse Fourier transform of the intensity measurements for when detector array 615 is offset from object 605, while reference numeral 635 is an illustration of the image and mirror image of the object formed according to the techniques of the present application when detector array 610 is offset from object 605.

As illustrated in reference numeral 620, the inverse Fourier transform of the average intensity pattern across array 610 formed from the output of each detector yields a bright center spot 622. As illustrated in reference numeral 630, the inverse Fourier transform of the average intensity pattern across the array 615 formed from the output of each detector yields a bright center spot 632, vertical line 633 and horizontal line 634. Specifically, when detector array 615 is properly offset or displaced from the line of sight of object 605, the horizontal line 632 and the vertical line 633 appear branching out from the center spot 632. Accordingly, by measuring the average intensity pattern across array 610/615 and taking the Fourier transform of the average intensity pattern across the array 610/615, a determination may be made whether or not the array 610/615 is sufficiently offset from the line of sight of object 605 such that the image and mirror image of the object will be in separate quadrants as illustrated in image 635. Specifically, when the horizontal line 632 and the vertical line 633 appear branching out from the center spot 632, it may be determined that the array 610/615 is sufficiently offset from the line of sight of object 605.

Applying this concept to the system 100 of FIG. 1, processing device 120 may be configured to calculate the Fourier transform of the average intensity pattern across the array of detectors 105. If horizontal and vertical lines as illustrated in image 630 are not detected, or are not sufficiently intense or defined, processing device 120 may control the mechanical structure that allows for the tilting or shifting of the array of detectors 105. This process may repeat until the horizontal and vertical lines as illustrated in image 630 are detected, or are detected as being sufficiently intense or defined, at which point processing device 120 may determine that the array of detectors 105 is appropriately offset from the line of sight of object 110.

As illustrated, when detector array 610 is aligned with object 605, the resulting image overlaps the image of the object, the mirror image of the object, the delta function and the convolution of the object with itself. When detector array 615 is offset from object 605, the image of the object and the mirror image of the object are formed in different quadrants of the resulting overall image, allowing the image of the object to be determined without the delta function and convolution of the image with itself.

Figure 7:
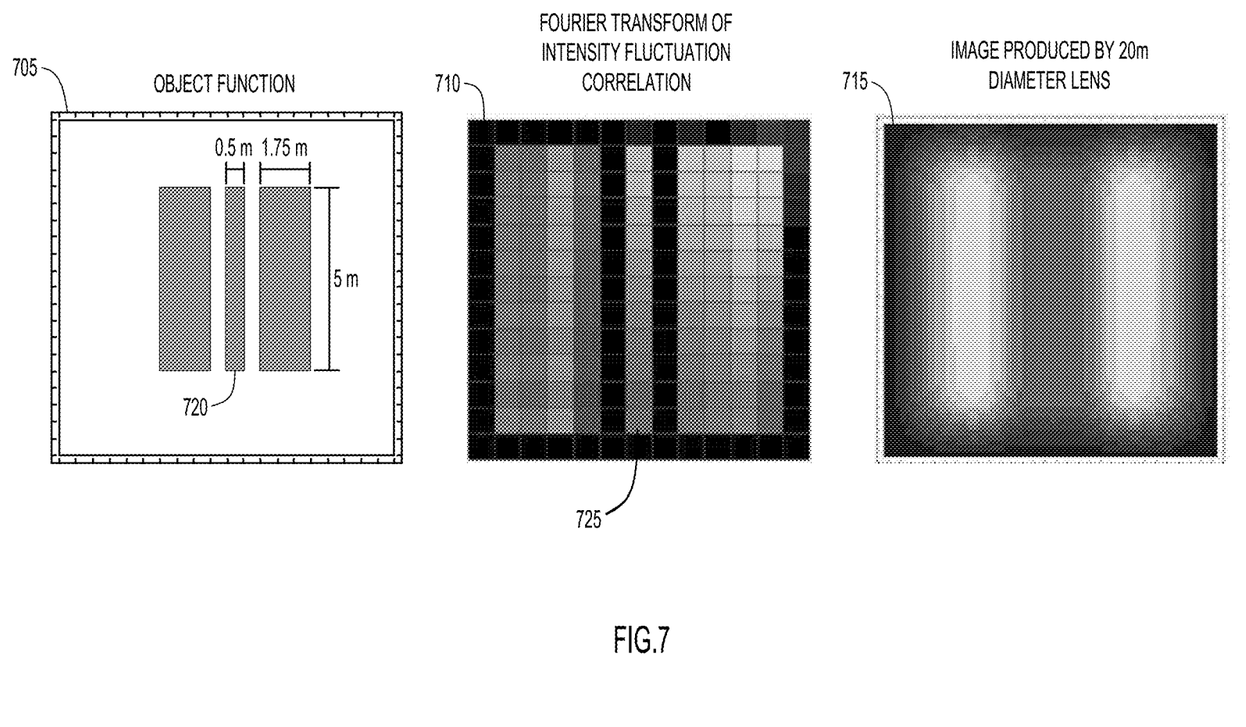
FIG. 7 provides a comparison of the imaging resolution achieved from the non-classical imaging techniques of the present disclosure and classical imaging techniques, according to example embodiments.

With reference now made to FIG. 7, depicted therein are illustrations showing the benefits of the techniques of the present disclosure. Included in FIG. 7 are object to be imaged 705, an image 710 of the object 705 produced by the techniques disclosed herein, and an image 715 of the object 705 produced through related art classical imaging techniques. More specifically, image 710 was produced using the non-classical imaging techniques of the present disclosure, while image 715 was produced using classical imaging techniques with a 21 meter lens.

As illustrated in image 705, the object includes 0.5 meter features, specifically, central portion 720 is 0.5 meters wide. If the object is at a range of $3.57 \times 10^7$ meters (22,236 miles), an array 729 of the detectors, like those illustrated in FIG. 5, distributed over a 21 meter by 21 meter area produces image 710. As illustrated in image 710, central portion 725 of image 710 successfully resolves middle portion 720 of image 705. Image 715, produced using classical imaging techniques and a 20 meter diameter lens fails to resolve middle portion 720 of image 705.

Figure 8:
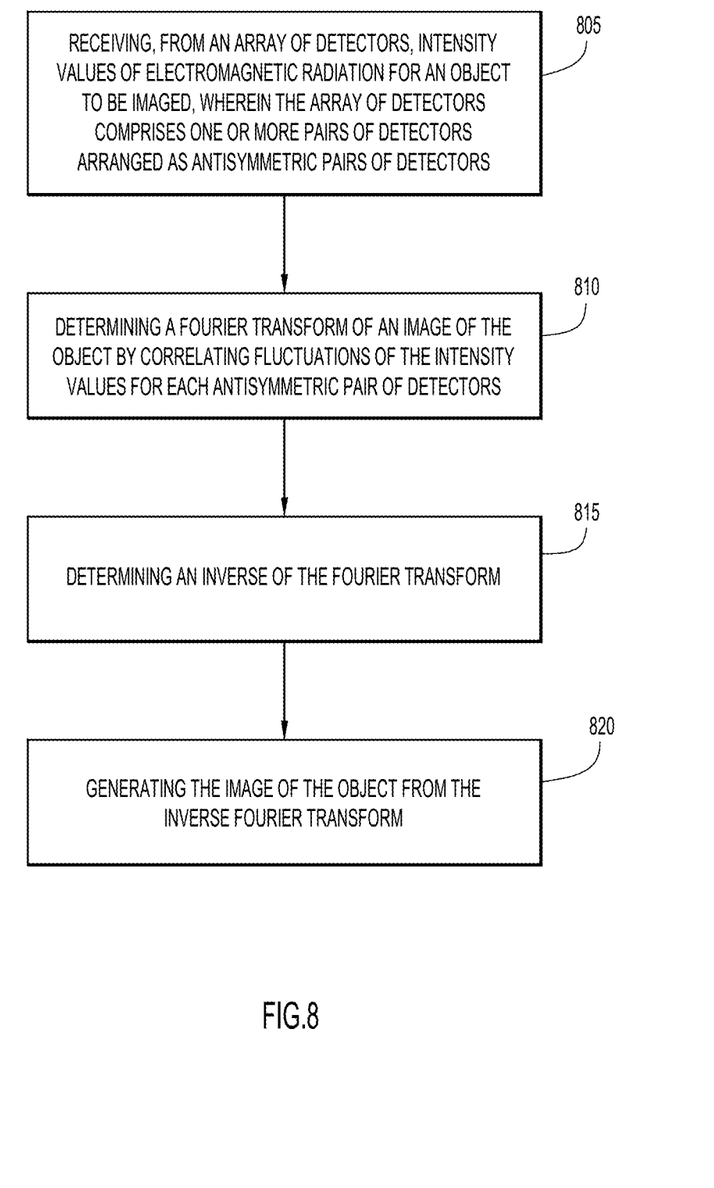
FIG. 8 is a flowchart illustrating a process flow for implementing the non-classical imaging techniques of the present disclosure, according to example embodiments.

With reference made to FIG. 8, depicted therein is a flowchart 800 providing a process flow for the techniques of the present application.

The process flow begins in operation 805 where intensity values for electromagnetic radiation are received from an array of detectors for an object to be imaged. The electromagnetic radiation may be reflected or emitted from the object to be imaged. The array of detectors includes one or more pairs of detectors that are arranged into anti symmetric pairs of detectors. The receipt of such intensity values may comprise receiving the intensity values from detector array 105 at processing device 120, as illustrated in FIG. 1. The intensity values may be associated with electromagnetic radiation of visible light, or other wavelengths/frequencies of light, such as infrared radiation, ultraviolet radiation, or electromagnetic radiation others having different wavelengths/frequencies In operation 810, a Fourier transform of an image of the object is determined by correlating fluctuations of the intensity values for each antisymmetric pair of detectors. For example, as described above, intensity values for each antisymmetric pair of detectors may be recorded over a first period of time. From these measurements, the average (e.g., the mean) combined intensity for the antisymmetric pair of detectors may be determined. Also from these measurements, fluctuations of the combined intensity for the antisymmetric pair of detectors may be determined. For example, the combined intensity for the antisymmetric pair of detectors at a second period of time may be compared with the determined average intensity to determine intensity fluctuations for the antisymmetric pair of detectors. This second period of time may be the same or shorter in duration than the first period of time. Similarly, an average (e.g., mean) intensity for one of the detectors of the antisymmetric pair may be determined for a third period of time. This third period of time may be the same as the first period of time for which the average combined intensity for the antisymmetric pair of detectors is determined. Also from these measurements, fluctuations of the intensity values for the one detector of the antisymmetric pair of detectors are determined. For example, intensity values from the one detector at a fourth period of time may be compared with the determined average intensity for the one detector to determine fluctuations for the one detector. This fourth period of time may be the same as the second period of time. The intensity fluctuations for the one detector may be correlated with the fluctuations of the combined intensity for the antisymmetric pair of detectors. As explained above, this correlation gives rise to data that includes the Fourier transform of the image of the object.

In operation 815, an inverse Fourier transform of the Fourier transform of the image of the object is determined. Finally, in operation 820, an image of the object is generated from the inverse Fourier transform.

Figure 9:
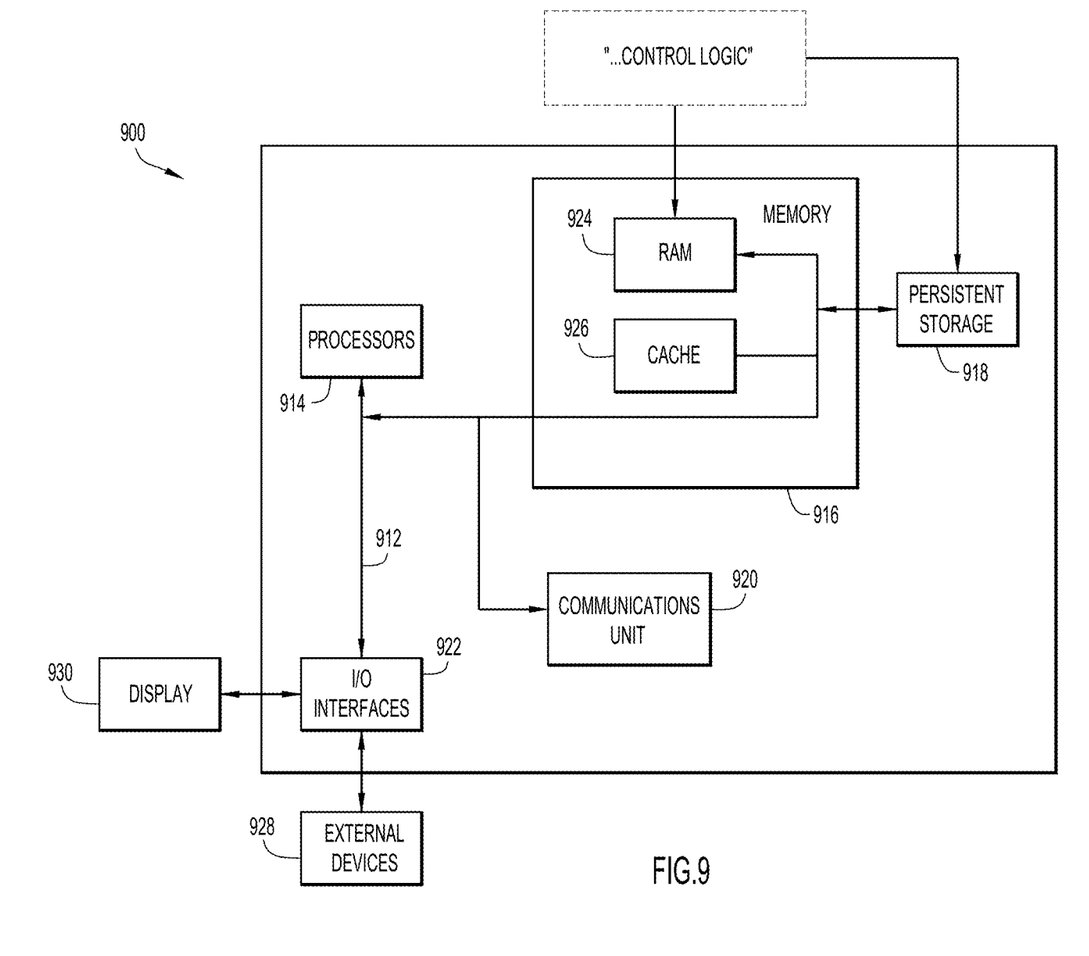
FIG. 9 is a block diagram of a processing apparatus configured to implement the non-classical imaging techniques of the present disclosure, according to example embodiments.

FIG. 9 illustrates a hardware block diagram of a computing device 900 that may perform the functions of any of the computing or control entities referred to herein in connection with the non-classical imaging techniques of the present disclosure, including processing device 120 of FIG. 1. It should be appreciated that FIG. 9 provides only an illustration of one embodiment and does not imply any limitations with regard to the environments in which different embodiments may be implemented. Many modifications to the depicted environment may be made.

As depicted, the device 900 includes a bus 912, which provides communications between computer processor(s) 914, memory 916, persistent storage 918, communications unit 920, and input/output (I/O) interface(s) 922. Bus 912 can be implemented with any architecture designed for passing data and/or control information between processors (such as microprocessors, communications and network processors, etc.), system memory, peripheral devices, and any other hardware components within a system. For example, bus 912 can be implemented with one or more buses. I/O interfaces 922 may be configured to receive data from, for example, the detector arrays illustrated in FIGS. 1, 4 and 6.

Memory 916 and persistent storage 918 are computer readable storage media. In the depicted embodiment, memory 916 includes random access memory (RAM) 924 and cache memory 926. In general, memory 916 can include any suitable volatile or non-volatile computer readable storage media. Instructions for the non-classical imaging techniques of the present disclosure may be stored in memory 916 or persistent storage 918 for execution by processor(s) 914. The control logic stored in memory 916 or persistent storage 918 may implement the non-classical imaging techniques of the present application. Additionally, memory 916 and/or persistent storage 918 may store the data received from, for example, the detector arrays illustrated in FIGS. 1, 4 and 6.

One or more programs may be stored in persistent storage 918 for execution by one or more of the respective computer processors 914 via one or more memories of memory 916. The persistent storage 918 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 918 may also be removable. For example, a removable hard drive may be used for persistent storage 918. Other examples include optical and magnetic disks, thumb drives, and smart cards that are inserted into a drive for transfer onto another computer readable storage medium that is also part of persistent storage 918.

Communications unit 920, in these examples, provides for communications with other data processing systems or devices. In these examples, communications unit 920 includes one or more network interface cards. Communications unit 920 may provide communications through the use of either or both physical and wireless communications links.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   receiving, from an array of detectors, intensity values of electromagnetic radiation for an object to be imaged, wherein the array of detectors comprises one or more pairs of detectors arranged as antisymmetric pairs of detectors;
   determining a Fourier transform of an image of the object by correlating fluctuations of the intensity values for each antisymmetric pair of detectors;
   determining an inverse of the Fourier transform; and
   generating the image of the object from the inverse of the Fourier transform.

2. The method of claim 1, wherein the array of detectors comprises a plurality of detectors arranged about a midpoint, and wherein a first detector of each antisymmetric pair of detectors is arranged at a location corresponding to the location of a second detector of each antisymmetric pair of detectors reflected through the midpoint of the array of detectors.

3. The method of claim 1, wherein each detector of the array of detectors comprises a single photon detector.

4. The method of claim 1, wherein each detector of the array of detectors comprises a parabolic mirror and a photomultiplier tube.

5. The method of claim 1, wherein correlating the fluctuations of the intensity values comprises determining combined intensity fluctuations for each antisymmetric pair of detectors, and correlating the combined intensity fluctuations with an intensity fluctuation for one detector of the antisymmetric pair of detectors.

6. The method of claim 1, wherein correlating the fluctuations of the intensity values comprises:
   calculating a combined mean intensity of each antisymmetric pair of detectors;
   calculating a fluctuation from the combined mean intensity for each antisymmetric pair of detectors;
   calculating a mean intensity of a first detector of each antisymmetric pair of detectors;
   calculating a fluctuation from the mean intensity of the first detector; and
   correlating the fluctuation from the combined mean intensity for each antisymmetric pair of detectors with the fluctuation from the mean intensity of the first detector of each antisymmetric pair of detectors.

7. The method of claim 1, wherein determining the Fourier transform of the image of the object by correlating fluctuations of the intensity values for each antisymmetric pair of detectors comprises determining the Fourier transform for all antisymmetric pairs of detectors in the array of detectors.

8. The method of claim 1, wherein the electromagnetic radiation is received via reflection from the object to be imaged.

9. The method of claim 1, further comprising:
   calculating a Fourier transform of an average intensity pattern across the array of detectors; and
   offsetting the array of detectors from a line-of-sight of the object based upon the Fourier transform of the average intensity pattern across the array of detectors.

10. An apparatus comprising:
    an array of detectors comprising one or more pairs of detectors arranged as antisymmetric pairs of detectors;
    an interface; and
    a processor, wherein the processor is configured to:
    receive, via the interface from the array of detectors, intensity values of electromagnetic radiation for an object to be imaged;
    determine a Fourier transform of an image of the object by correlating fluctuations of the intensity values for each antisymmetric pair of detectors;
    determine an inverse of the Fourier transform; and
    generate the image of the object from the inverse of the Fourier transform.

11. The apparatus of claim 10, wherein the array of detectors is configured to move such that a center point of the array of detectors is offset from a line of sight of the object to be imaged.

12. The apparatus of claim 10, wherein the processor is configured to correlate the fluctuations of the intensity values by:
    calculating a combined mean intensity of each antisymmetric pair of detectors;
    calculating a fluctuation from the combined mean intensity for each antisymmetric pair of detectors;
    calculating a mean intensity of a first detector of each antisymmetric pair of detectors;
    calculating a fluctuation from the mean intensity of the first detector; and
    correlating the fluctuation from the combined mean intensity for each antisymmetric pair of detectors with the fluctuation from the mean intensity of the first detector of each antisymmetric pair of detectors.

13. The apparatus of claim 10, wherein each detector of the array of detectors comprises a parabolic mirror and a photomultiplier tube.

14. The apparatus of claim 10, wherein the array of detectors comprises a plurality of detectors arranged about a midpoint, and wherein a first detector of each antisymmetric pair of detectors is arranged at a location corresponding to the location of a second detector of each antisymmetric pair of detectors reflected through the midpoint of the array of detectors.

15. A tangible, non-transitory computer readable media encoded with instructions, wherein the instruction, when executed by a processor, are operable to:
    receive, from an array of detectors, intensity values of electromagnetic radiation for an object to be imaged, wherein the array of detectors comprises one or more pairs of detectors arranged as antisymmetric pairs of detectors;
    determine a Fourier transform of an image of the object by correlating fluctuations of the intensity values for each antisymmetric pair of detectors;
    determine an inverse of the Fourier transform; and
    generate the image of the object from the inverse of the Fourier transform.

16. The tangible, non-transitory computer readable media of claim 15, wherein the instructions are further operable to correlate the fluctuations of the intensity values by:
    calculating a combined mean intensity of each antisymmetric pair of detectors;
    calculating a fluctuation from the combined mean intensity for each antisymmetric pair of detectors;

calculating a mean intensity of a first detector of each antisymmetric pair of detectors;

calculating a fluctuation from the mean intensity of the first detector; and correlating the fluctuation from the combined mean intensity for each antisymmetric pair of detectors with the fluctuation from the mean intensity of the first detector of each antisymmetric pair of detectors.

17. The tangible, non-transitory computer readable media of claim 15, wherein the array of detectors comprises a plurality of detectors arranged about a midpoint, and wherein a first detector of each antisymmetric pair of detectors is arranged at a location corresponding to the location of a second detector of each antisymmetric pair of detectors reflected through the midpoint of the array of detectors.

18. The tangible, non-transitory computer readable media of claim 15, wherein the instructions operable to determine the Fourier transform of the image of the object by correlating the fluctuations of the intensity values for each antisymmetric pair of detectors are further operable to determine the Fourier transform for all antisymmetric pairs of detectors in the array of detectors.

19. The tangible, non-transitory computer readable media of claim 15, wherein the electromagnetic radiation is received via reflection from the object to be imaged.

20. The tangible, non-transitory computer readable media of claim 15, wherein each detector of the array of detectors comprises a parabolic mirror and a photomultiplier tube.

* * * * *